(12) United States Patent
Oh et al.

(10) Patent No.: US 7,562,414 B2
(45) Date of Patent: Jul. 21, 2009

(54) DUST SENSING UNIT FOR USE IN VACUUM CLEANER

(75) Inventors: Jang-keun Oh, Gwangju (KR); Min-ha Kim, Gwangju (KR); Jin-gon Lee, Gwangju (KR); Jung-gyun Han, Gwangju (KR); Seung-yong Cha, Gwangju (JP)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 0 days.

(21) Appl. No.: 11/903,966

(22) Filed: Sep. 25, 2007

(65) Prior Publication Data

US 2008/0250599 A1  Oct. 16, 2008

(30) Foreign Application Priority Data

Apr. 11, 2007 (KR) ............... 10-2007-0035434

(51) Int. Cl.
*A47L 9/28* (2006.01)
(52) U.S. Cl. ........................ 15/339; 15/319
(58) Field of Classification Search .......... 15/319, 15/339; *A47L 9/28*
See application file for complete search history.

(56) References Cited

U.S. PATENT DOCUMENTS 5,033,151 A * 7/1991 Kraft et al. ............... 15/319
5,572,767 A * 11/1996 Ishikawa .................. 15/319
5,815,884 A * 10/1998 Imamura et al. ........... 15/339
6,023,814 A * 2/2000 Imamura .................. 15/339
2006/0093501 A1* 5/2006 Lee et al.

FOREIGN PATENT DOCUMENTS

DE    102005023406    *  5/2006
JP        9149871    * 10/1997
JP       10000174    *  6/1998

OTHER PUBLICATIONS

Official Action dated Dec. 10, 2008 corresponding to Russian Application No. 2007146233/12(050669).*

* cited by examiner

*Primary Examiner*—David A Redding
(74) *Attorney, Agent, or Firm*—Ohlandt, Greeley, Ruggiero & Perle, L.L.P.

(57) ABSTRACT

A dust sensing unit for use in a vacuum cleaner, which can detect whether there is dust or dirt on a surface to be cleaned and inform a user of the detected result in cleaning, is disclosed. The dust sensing unit includes a body having an air flowing passage therein to move air laden with dust or dirt drawn in through a suction nozzle, a detecting sensor disposed on the air flowing passage to detect whether the dust or dirt is passing through the air flowing passage, a lamp part to operate according to a signal outputted from the detecting sensor, a rotating part disposed to the body to rotate by air flowing through the air flowing passage, and an electric generator rotated by the rotating part to generate an electric power.

15 Claims, 12 Drawing Sheets

DUST SENSING UNIT FOR USE IN VACUUM CLEANER

CROSS-REFERENCE TO RELATED APPLICATIONS

This application claims the benefit under 35 U.S.C. § 119(a) from Korean Patent Application No. 10-2007-35434, filed on Apr. 11, 2007, in the Korean Intellectual Property Office, the entire disclosure of which is incorporated herein by reference.

BACKGROUND OF THE INVENTION

1. Field of the Invention

The present disclosure relates to a vacuum cleaner. More particularly, the present disclosure relates to a dust sensing unit for use in a vacuum cleaner, which can detect whether there is dust or dirt on a surface to be cleaned and inform a user of the detected result.

2. Description of the Related Art

Generally, in cleaning, a vacuum cleaner generates a strong suction force by using a suction motor, so that it draws in dust or dirt from a surface to be cleaned thus to clean the surface to be cleaned. Accordingly, the vacuum cleaner is very usefully in cleaning dust or dirt adhered to a surface to be cleaned, such as a carpet, a floor and the like.

When a user cleans a surface with the vacuum cleaner, she or he can easily perceive whether there is dust or dirt on the surface to be cleaned in a cleaning area contaminated or soiled with relatively large dust or relatively conspicuous dirt. However, the user can not easily perceive whether there is dust or dirt on the surface to be cleaned in a cleaning area soiled with relatively minute dust.

To addressee the problem as described above, the conventional vacuum cleaner has a dust sensing apparatus for detecting whether there is dust or dirt mounted in a suction nozzle, which draws in the dust or dirt from the surface to be cleaned in cleaning. Such a dust sensing apparatus is configured, so that it detects the dust or dirt drawn in through the suction nozzle in cleaning and informs a user of whether there is the drawn-in dust or dirt through a light-emitting lamp or the like. Accordingly, the user can perceive whether there is the dust or dirt on the surface to be cleaned or whether the dust or dirt is completely removed from the surface to be cleaned according to the operation of the light-emitting lamp in cleaning. However, since the dust sensing apparatus as described above is usually operated by a separate battery, there is a problem in that the battery should be charged with electricity or replaced with a new one if it is consumed.

SUMMARY OF THE INVENTION

The present disclosure has been developed in order to solve the above problems in the related art. Accordingly, an aspect of the present disclosure is to provide a dust sensing unit for use in a vacuum cleaner capable of automatically detecting whether there is dust or dirt on a surface to be cleaned and informing a user of the detected result without using an external battery in cleaning.

Another aspect of the present disclosure is to provide a dust sensing unit for use in a vacuum cleaner, which is configured to be replaced as a single part in failure, and at the same time, to be modularized, there by reducing a maintenance cost.

Also another aspect of the present disclosure is to provide a dust sensing unit for use in a vacuum cleaner in which a rotating part is disposed, so that it is isolated from dust or dirt of an air flowing passage as maximum as possible, thereby preventing a failure of the rotating part and a failure of an electric generator according thereto and improving a lifespan of the rotating part and the electric generator.

The above aspects are achieved by providing a dust sensing unit for use in a vacuum cleaner, which includes a body having an air flowing passage therein to move air laden with dust or dirt drawn in through a suction nozzle, a detecting sensor disposed on the air flowing passage of the body to detect whether the dust or dirt passes through the air flowing passage, a lamp part to operate according to a signal outputted from the detecting sensor, a rotating part disposed to the body to rotate by air flowed and moved into the air flowing passage of the body, and an electric generator rotated by the rotating part thus to generate an electric power. The body is disposed between the suction nozzle and a cleaner body, and the electric generator supplies the electric power to at least one of the detecting sensor and the lamp part.

Here, the body may be detachably disposed between the suction nozzle and an extended tube, between the extended tube and an operating handle, or between a suction hose and the cleaner body. For this, preferably, but not necessarily, the body has first and second connectors disposed at both ends thereof and detachably connected to the suction nozzle and the extended tube, the extended tube and the operating handle, or the suction hose and the cleaner body, respectively.

Alternatively, the body may be integrally formed with the suction nozzle, the extended tube, the operating handle, or the suction hose.

The detecting sensor may be an optical sensor having a light-emitting part and a light-receiving part.

The lamp part may include a first lamp to operate according to a first signal generating when the detecting sensor detects the dust or dirt, and a second lamp to operate according to a second signal generating when the detecting sensor does not detect the dust or dirt.

The rotating part may be an impeller having a rotating axis disposed parallel to or perpendicular to a longitudinal axis of the air flowing passage.

Alternatively, the dust sensing unit may further include a muffler part to reduce noises generating in rotating of the rotating part. Preferably, but not necessarily, the muffler part includes a plurality of resonating holes formed in the body, and a noise-absorbing member filled in a space between a cover and the body.

In accordance with another aspect of the present disclosure, the dust sensing unit may further include a subsidiary rotation driving-passage part to draw in an external air from an outside by a suction force of the vacuum cleaner and thus to rotate the rotating part along with the air drawn in through the suction nozzle.

In accordance with further another aspect of the present disclosure, the dust sensing unit may further include a rotation driving-passage part to drawn in an external air from an outside by a suction force of the vacuum cleaner thus to rotate the rotating part only by the external air.

In accordance with also another aspect of the present disclosure, the dust sensing unit may further include a rotation driving-passage part to diverge a portion of the air moving through the air flowing passage therefrom and then to guide the portion of the air to drive the rotating part.

DESCRIPTION OF THE DRAWING FIGURES

The above aspects and other advantages of the present disclosure will be more apparent by describing exemplary embodiments of the present disclosure with reference to the accompanying drawing figures, in which:

FIG. 1 is a partially broken-away perspective view exemplifying a dust sensing unit for use in a vacuum cleaner according to a first exemplary embodiment of the present disclosure;

FIGS. 2A. 2B and 2C are partial cross-sectional view exemplifying operations of a detecting sensor and a lamp part of the dust sensing unit illustrated in FIG. 1;

Throughout the drawings, like reference numerals will be understood to refer to like parts, components and structures.

DETAILED DESCRIPTION OF AN EXEMPLARY EMBODIMENT

Hereinafter, a dust sensing unit for use in a vacuum cleaner according to exemplary embodiments of the present disclosure will now be described in greater detail with reference to the accompanying drawing figures.

Figure 11:
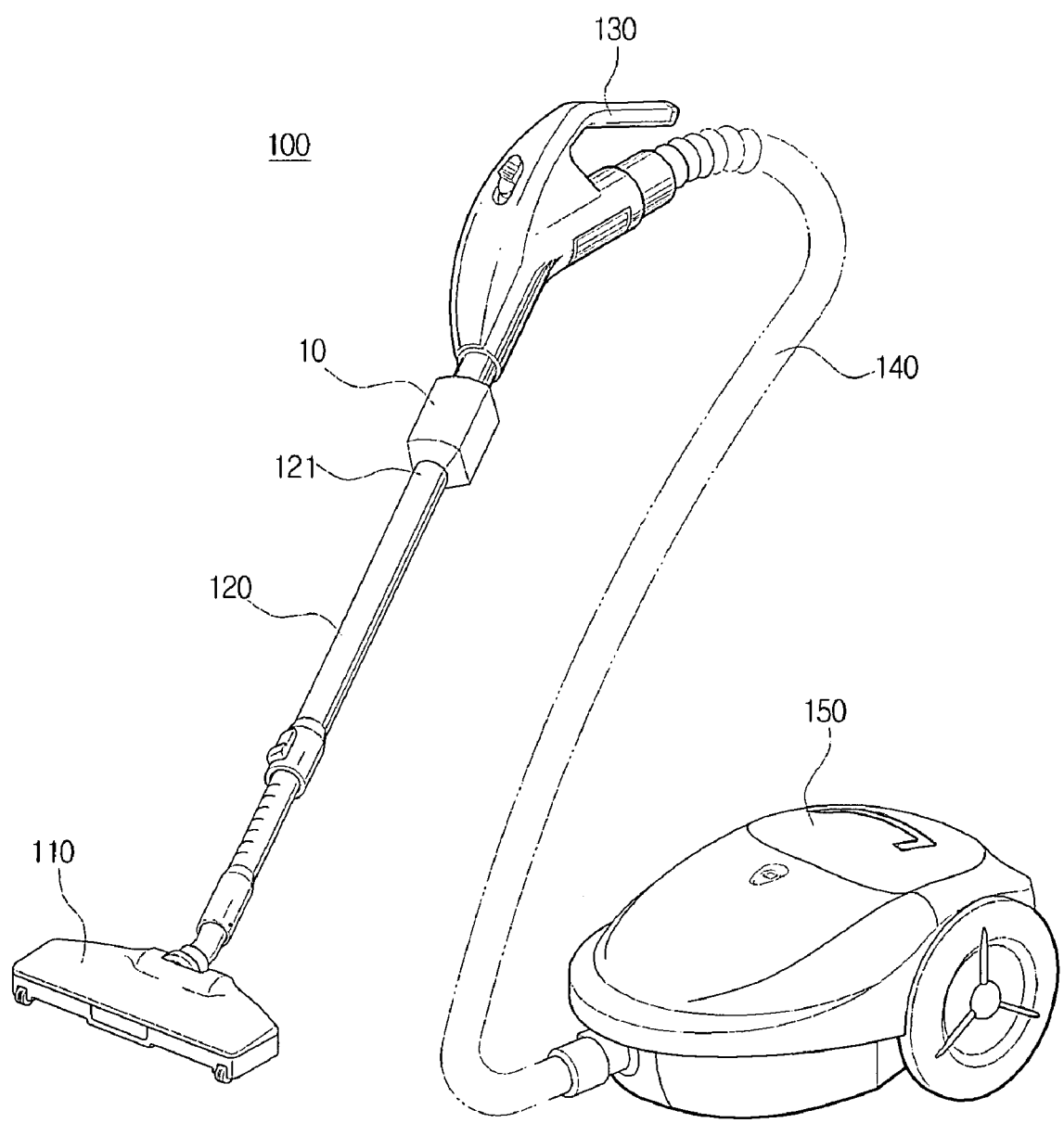
FIG. 11 is a perspective view exemplifying a vacuum cleaner to which the dust sensing unit according to the first exemplary embodiment of the present disclosure is applied.

FIG. 11 is a perspective view exemplifying an example of a vacuum cleaner 100 to which a dust sensing unit 10 according to a first exemplary embodiment of the present disclosure is applied Referring to FIG. 11, the vacuum cleaner 100 includes a suction nozzle 110, a telescopically extended tube 120, an operating handle 130, a dust sensing unit 10, a suction hose 140, and a cleaner body 150. The suction nozzle 110 draws in air laden with dust or dirt. The extended tube 120 is connected to the suction nozzle 110. The dust sensing unit 10 is installed between the operating handle 130 and the extended tube 120. The suction hose 140 is connected is connected to the operating handle 130. The cleaner body 150 is connected to the suction hose 140 and is divided into a dust collecting chamber (not illustrated) and a motor chamber (not illustrated).

Figure 1:
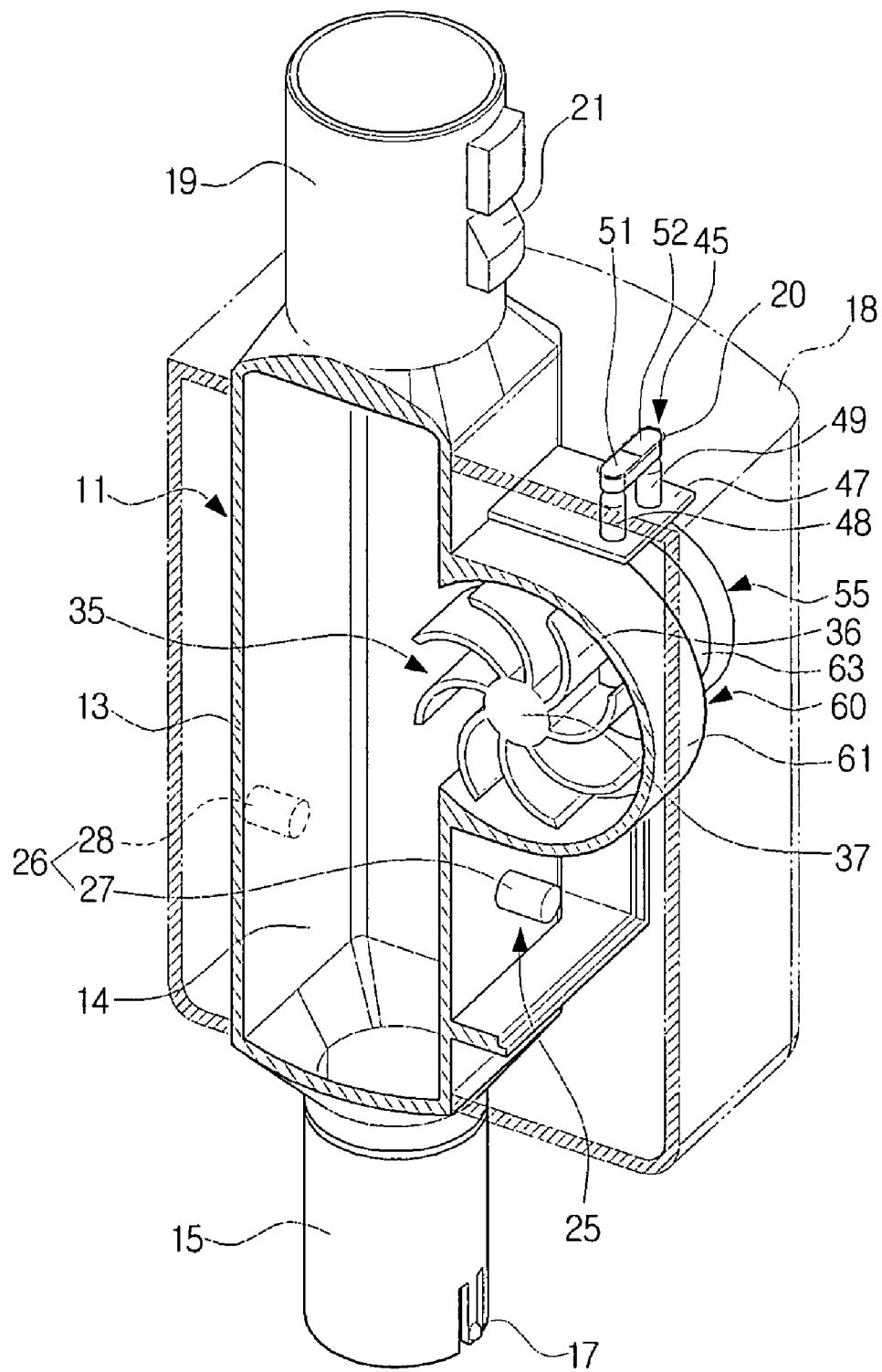

FIG. 1 is a partially broken-away perspective view exemplifying the dust sensing unit 10 for use in the vacuum cleaner according to the first exemplary embodiment of the present disclosure.

As illustrated in FIGS. 1 and 11, the dust sensing unit 10 is detachably disposed between extended tube 120 and the operating handle 130, and includes a body 11, a detecting sensor 25, a lamp part 45, a rotating part 35, an electric generator 55, and a cover 18.

The body is formed of a rectangular parallelepiped tube 13. The rectangular parallelepiped tube 13 has an air flowing passage 14 therein to communicate with the extended tube 120 and the operating handle 130 and thus to move air laden with the dust or dirt drawn in through the suction nozzle 110 toward the operating handle 130 from the extended tube 120.

The rectangular parallelepiped tube 13 at upper and lower ends has first and second connectors 15 and 19, which detachably fix the body 11 to the extended tube 120 and the operating handle 130, respectively. The first connector 15 is formed of a cylindrical tube having a diameter smaller than that of a first corresponding connector 121 of the extended tube 120, so that it can be inserted into the first corresponding connector 121. The first connector 15 at a lower end thereof has a first flexible protrusion 17, which is inserted into a first fixing groove (not illustrated) in the first corresponding connector 121 when it is connected with the first corresponding connector 121. When the first connecter 15 is separated from the first corresponding connector 121, the first flexible protrusion 17 is pushed by a first button (not illustrated) of the first corresponding connector 121 and thus easily slipped out from the first fixing groove. Like the first connecter 15, the second connector 19 is formed of a cylindrical tube having a diameter larger than that of a second corresponding connector (not illustrated) of the operating handle 130, so that it can accommodate the second corresponding connector. On the second connector 19 are formed a second fixing groove 22 (see FIG. 6) and a second button 21. The second fixing groove 22 accommodates a second flexible protrusion (not illustrated) formed on the second corresponding connector when the second connector 19 is connected with the corresponding connector. The second button 21 has a pushing part 21', which elastically pushes down the second flexible protrusion inserted into the second fixing groove 22, so that the second flexible protrusion is easily slipped out from the second fixing groove 22, when the second connector 19 is separated from the corresponding connector.

In the above description, although the body 11 is illustrated as detachably mounted to the extended tube 120 and the operating handle 130 by the first and the second connectors 15 and 19 and the first and the second corresponding connectors 121, the present disclosure is not limited thereto.

For instance, it goes without saying that the body 11 can be also detachably installed between the suction nozzle 110 and the extended tube 120 or between the suction hose 140 and the cleaner body 150 by first and second connectors 15 and 19 and first and second corresponding connectors 121 having the same constructions.

Figure 12:
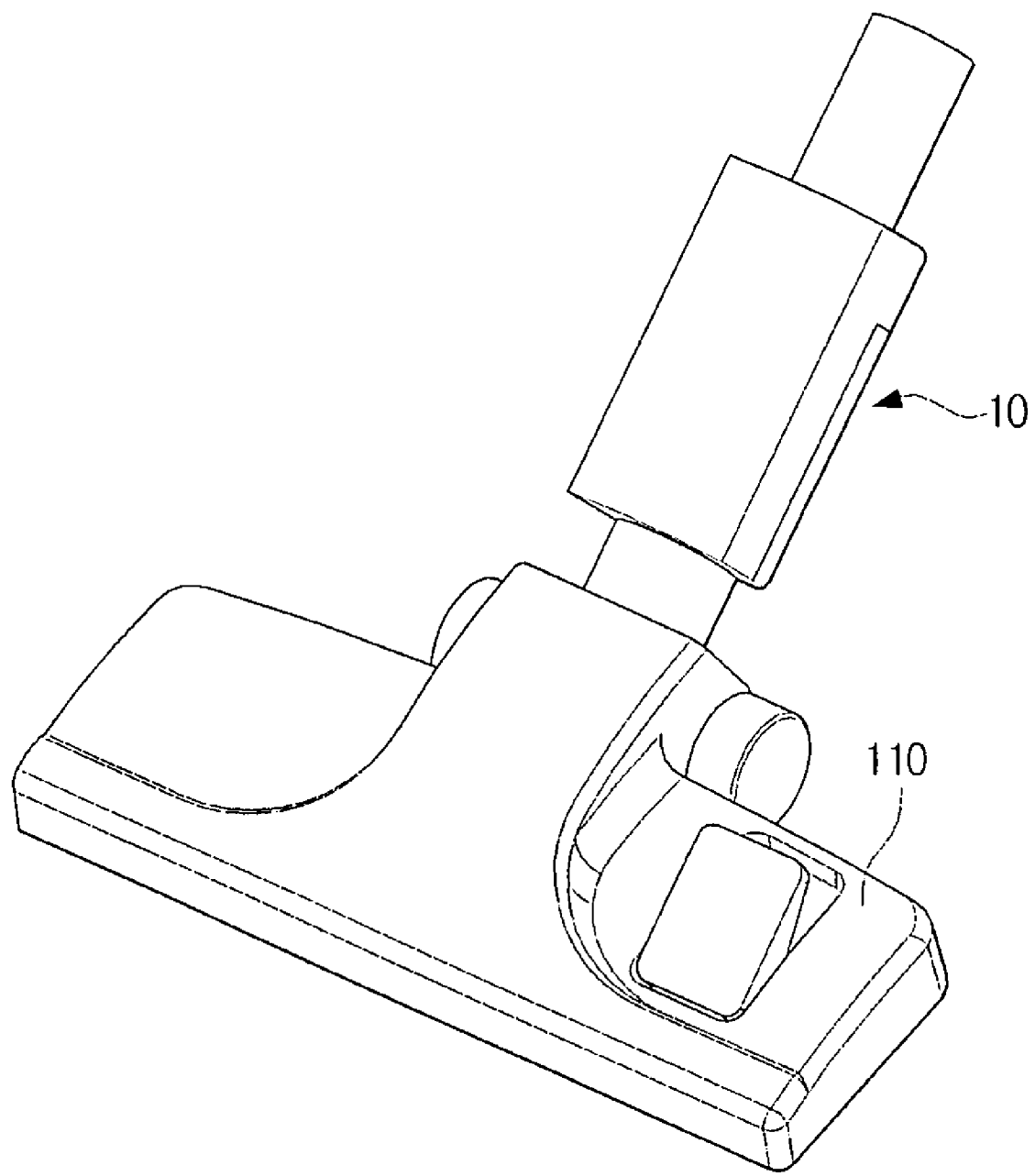
FIG. 12 is a perspective view exemplifying a suction nozzle to which the dust sensing unit according to the first exemplary embodiment of the present disclosure is applied.

In addition, instead of being detachably installed among the suction nozzle 110, the extended tube 120, the operating handle 130 and the cleaner body 150, the body 11 can be integrally formed with the suction nozzle 110 (see FIG. 12), the extended tube 120, the operating handle 130 or the cleaner body 150. In this case, on a free end of the body 11 is formed only one connector 15 or 19 corresponding to a corresponding connector of the suction nozzle 110, the extended tube 120, the operating handle 130 or the cleaner body 150.

The detecting sensor 25, which detects whether there is dust or dirt in the air drawn in through the suction nozzle 110 when it passes through the air flowing passage 14 of the rectangular parallelepiped tube 13 during cleaning, is disposed at the entrance of the air flowing passage 14. The detecting sensor 25 may be an optical sensor 26 having a light-emitting part 27 and a light-receiving part 28. In this case, the light-emitting part 27 is installed in one surface of the rectangular parallelepiped tube 13 to emit light toward the air flowing passage 14, and the light-receiving part 28 is installed in another surface of the rectangular parallelepiped tube 13, opposite to the surface having the light-emitting part 27, to receive the light passing though the air flowing passage 14. Accordingly, if there is dust or dirt in the air passing through the air flowing passage 14 of the rectangular parallelepiped tube 13, the light emitted from the light-emitting part 27 is blocked by the dust or dirt. As a result, the optical sensor 26 generates an OFF signal. To the contrary, if there is no dust or dirt in the air, the light-receiving part 28 receives the light emitted from the light-emitting part 27. As a result, the optical sensor 26 generates an ON signal.

The lamp part 45, which operates according to the ON and OFF signals from the detecting sensor 25 to inform a user of whether there is the dust or dirt in the air drawn in through the suction nozzle 110 in cleaning, is installed on a circuit board 47. The circuit board 47 is disposed over a generator bracket 60 to be described later, which is mounted on an outer side of the one surface of the rectangular parallelepiped tube 13. The lamp part 45 is made up of first and second lamps 48 and 49. The first lamp 48 is operated by the OFF signal generated when the detecting sensor 25 detects the dust or dirt, and the second lamp 49 is operated by the ON signal generated when the detecting sensor 25 does not detect the dust or dirt. Red and blue transparent plates 51 and 52 are installed in a lamp hole 20 of a cover 18, which is located opposite to the first and the second lamps 48 and 49. At this time, if the first and the second lamps 48 and 49 are formed of laser emitting diodes (LEDs), only a colorless transparent plate (not illustrated) is installed in the lamp hole 20 instead of the red and the blue transparent plates 51 and 52 because the LEDs can emit color light, such red light, blue light, etc., by themselves, respectively The rotating part 35, which generates a rotating force to rotate a coil part (not illustrated) of the electric generator 55, is made up of an impeller 36. The impeller 36 is arranged to be rotated by the draw-in air passing through the air flowing passage 14 of the rectangular parallelepiped tube 13. For this, a portion of the impeller 36 is projected into the air flowing passage 14 through an opening of the rectangular parallelepiped tube 13. The impeller 36 has a rotating axis 37, which is connected on an axis of the electric generator 55 mounted on a generator mounting part 63 of the generator bracket 60. The rotating axis 37 of the impeller 36 is perpendicularly arranged to a longitudinal axis of the air flowing passage 14.

The electric generator 55, which generates an electric power to operate the detecting sensor 25 and the lamp part 45, is rotated by the impeller 36. For this, the axis of the electric generator 55 is connected to the rotating axis 37 of the impeller 36. The electric generator 55 may be formed of a known electric generator having a coil part, which is installed on the axis thereof between an N-polar magnet and an S-polar magnet. To supply the generated electric power to the lamp part 45 and the detecting sensor 25, the coil part of the electric generator 55 is connected to the circuit board 47 on which the lamp part 45 is mounted. The lamp part 45 and the detecting sensor 25 are electrically connected to the circuit board 47. Alternatively, to use the electric power generated by the electric generator 55 as a power source for driving a power or circuit part of the operating handle 130, the circuit board 47 can be configured, so that it is electrically connected with the circuit part of the operating handle 130 by a electric wire or connector, which is not illustrated.

The cover 18 is formed to wrap the entire of the rectangular parallelepiped tube 13 on which the detecting sensor 25, the lamp part 45, the rotating part 35, and the electric generator 55 are installed. The cover 18 is fixed to the rectangular parallelepiped tube 13 by fixing means, such as screws, etc.

Figure 3:
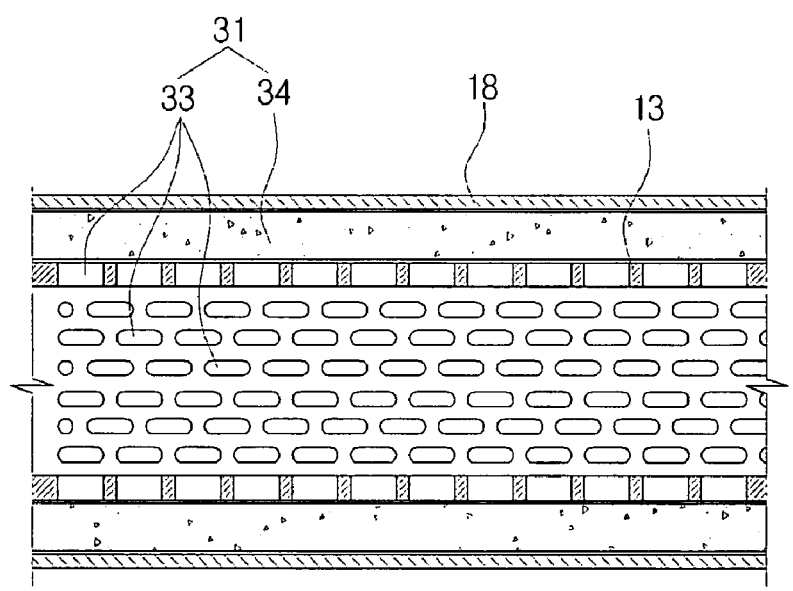
FIG. 3 is a partial cross-sectional view exemplifying a muffler part, which is applicable to the dust sensing unit illustrated in FIG. 1.

Alternatively, to reduce noises generating in rotating of the impeller 36, as illustrated in FIG. 3, a muffler part 31 can be formed in the dust sensing unit 10. The muffler part 31 is made up of a plurality of resonating holes 33, and a noise-absorbing member 34, such as a sponge. The resonating holes 33 are formed in predetermined shape and arrangement in a portion of the rectangular parallelepiped tube 13 in a part non-mounting area except a part mounting area in which the detecting sensor 25, the lamp part 45, the rotating part 35, and the electric generator 55 are installed. The noise-absorbing member 34 is filled between the cover 18 and the rectangular parallelepiped tube 13 in the part non-mounting area. With this configuration, the noises generating in rotating of the impeller 36 are first removed by the noise-absorbing member 34, and then secondly diminished and vanished by the resonating holes 33.

Hereinafter, an operation of the dust sensing unit 10 according to the first exemplary embodiment of the present disclosure constructed as described above will be explained in detail with reference to FIGS. 1 through 2C and 11.

First, to clean dust or dirt adhered to the surface to be cleaned, as illustrated in FIG. 11, a user starts the vacuum cleaner 100 while bringing the suction nozzle 110 in contact with the surface to be cleaned. Then, a suction motor (not illustrated) in the motor chamber of the cleaner body 150 is operated, so that it generates a suction force. As a result, air is drawn in along with dust or dirt through an air inlet (not illustrated) of the suction nozzle 110. The air drawn in along with the dust or dirt through the air inlet is flows into the air flowing passage 14 of the rectangular parallelepiped tube 13 through the extended tube 120, flows to the cleaner body 150 through the operating handle 130 and the suction hose 140, so that the dust or dirt is separated from the air in the dust collecting chamber, and then discharged to the outside.

Figure 2A:
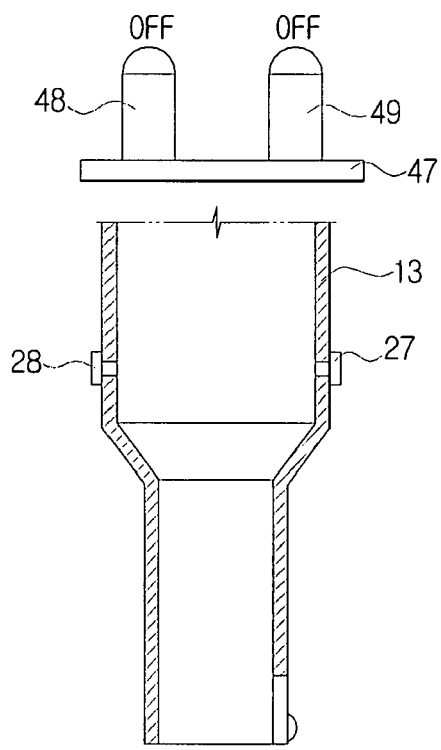
Figure 2B:
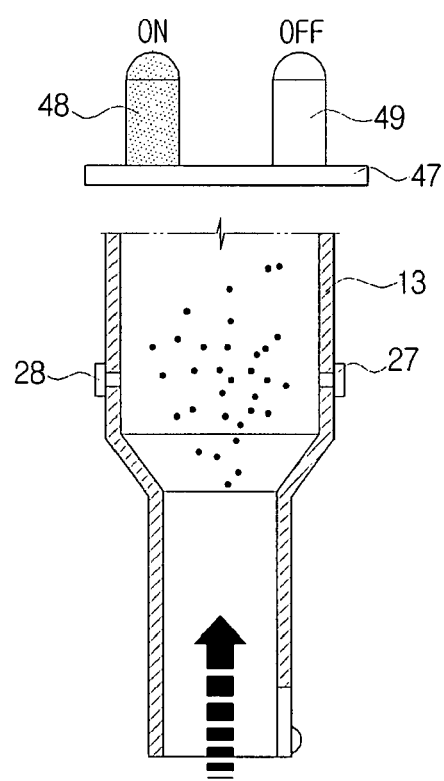
Figure 2C:
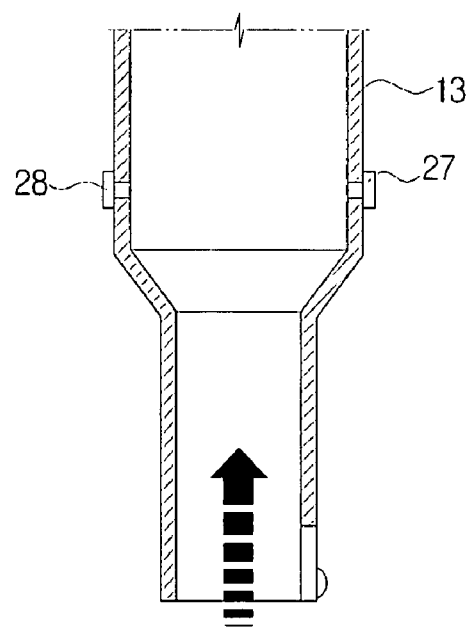

At this time, the impeller 36 of the rotating part 35 is rotated by the air passing through the air flowing passage 14. As a result, the axis of the electric generator 55 connected to the rotating axis 37 of the impeller 36 is rotated, so that the electric generator 55 generates an electric power by the coil part thereof, which is rotated along with the axis thereof. The electric power generated from the electric generator 55 is transmitted to the detecting sensor 25 and the lamp part 45 through the circuit board 47. As the electric power is supplied to the detecting sensor 25, the light-emitting part 27 of the optical sensor 26 of the detecting sensor 25 emits light. Accordingly, when the dust or dirt passes between the light-emitting part 27 and the light-receiving part 28, the optical sensor 26 generates an OFF signal because the light-receiving part 28 has not received the light emitted from the light-emitting part 27 due to the blockage of the dust or dirt. To the contrary, when the dust or dirt does not pass between the light-emitting part 27 and the light-receiving part 28, the optical sensor 26 generates an ON signal because the light-receiving part 28 receives the light emitted from the light-emitting part 27. At this time, the lamp part 45 installed on the circuit board 47 turns on the first lamp 48 to generate red light through the red transparent plate 51 when the optical sensor 26 generates the OFF signal, as illustrated in FIG. 2B, and turns on the second lamp 49 to generate blue light through the blue transparent plate 52 when the optical sensor 26 generates the ON signal, as illustrated in FIG. 2C. As a result, the user can perceive whether there is dust or dirt on the surface to be cleaned according to the time or frequency, which generates the red light or the blue light.

After that, when the cleaning operation is completed, the vacuum cleaner 100 stops operating. Then, the air does not flow through the air flowing passage 14, so that the impeller 36 of the rotating part 35 is not rotated and thus the electric generator 55 does not generate the electric power. As a result, both the first and the second lamps 48 and 49 of the lamp part 45 are turned off, as illustrated in FIG. 2A.

Figure 4:
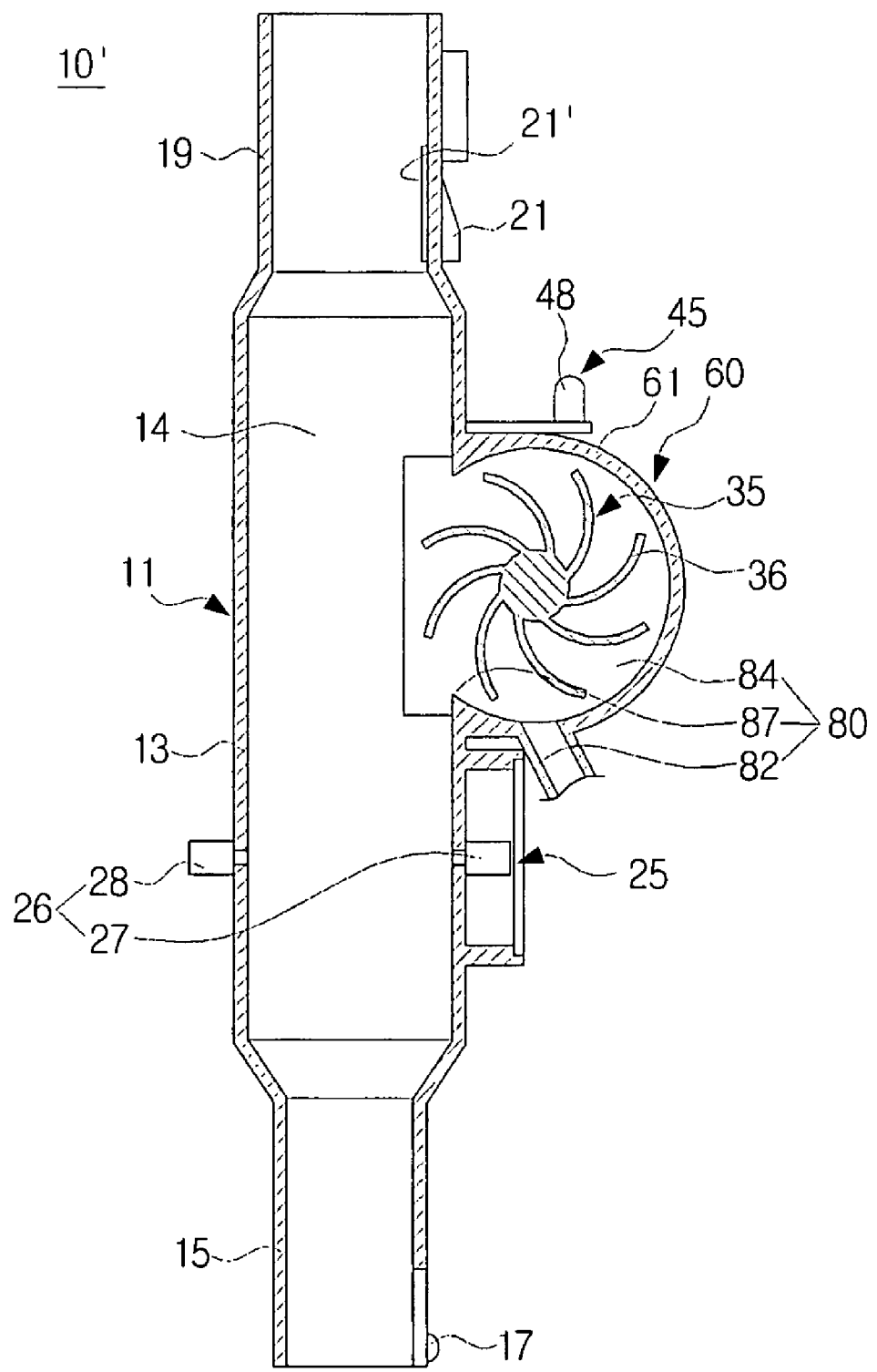
FIG. 4 is a cross-sectional view exemplifying a dust sensing unit for use in a vacuum cleaner according to a second exemplary embodiment of the present disclosure from which a cover is omitted.

FIG. 4 exemplifies a dust sensing unit 10' for use in a vacuum cleaner according to a second exemplary embodiment of the present disclosure.

The dust sensing unit 10' of the second exemplary embodiment has the same constructions as those of the dust sensing unit 10 of the first exemplary embodiment except that it further includes a subsidiary rotation driving-passage part 80. Accordingly, a detailed description on the constructions of the dust sensing unit 10' except the subsidiary rotation driving-passage part 80 will be omitted.

The subsidiary rotation driving-passage part 80, which to promote the driving of the impeller 36, directly draws in an external air from the outside by the suction force of the suction motor and thus rotates the impeller 36 along with the air in the air flowing passage 14 drawn in through the suction nozzle 110, is formed to a rotating part-mounting part 61 of the generator bracket 60 disposed on an outside of the one surface of the rectangular parallelepiped tube 13. As illustrated in FIG. 4, the subsidiary rotation driving-passage part 80 is made up of an inlet 82, an impeller-mounting space 84, and an outlet 87. The inlet 82, which directly draws in the external air from the outside by the suction force of the suction motor, is formed in a lower part of the rotating part-mounting part 61. At this time, as illustrated in FIG. 3, if the muffler part 31 is included in the dust sensing unit 10', the inlet 82 is formed, so that it is hermetically extended to the outside through the cover 18 from the lower part of the rotating part-mounting part 61 so as not to draw in the air in the dust sensing unit 10'. The impeller-mounting space 84 is a space through which the external air drawn in through the inlet 82 moves to rotate the impeller 36, and the impeller 36 is rotatably disposed in the impeller-mounting space 84. The outlet 87 at which the external air passing through the impeller-mounting space 84 joins the air of the air flowing passage 14 is formed in the rectangular parallelepiped tube 13 in a size that allows a portion of the impeller 36 to project into the air flowing passage 14.

As described above, if the dust sensing unit 10' has the subsidiary rotation driving-passage part 80, the rotation of the impeller 36 is promoted, thereby lessening the contamination of the impeller 36 due to the dust or dirt included in the drawn-in air, as well as allowing the electronic generator to increase a generation amount of electric power.

An operation of the dust sensing unit 10' for use in the vacuum cleaner constructed as described above is the same as that of the dust sensing unit 10 of the first exemplary embodiment explained with reference to FIG. 1 except that the external air is additionally drawn in through the subsidiary rotation driving-passage part 80 to rotate the impeller 36, so that it assists the electric generator to generate the electric power. Accordingly, a detailed description on the operation of the dust sensing unit 10' will be omitted.

Figure 5:
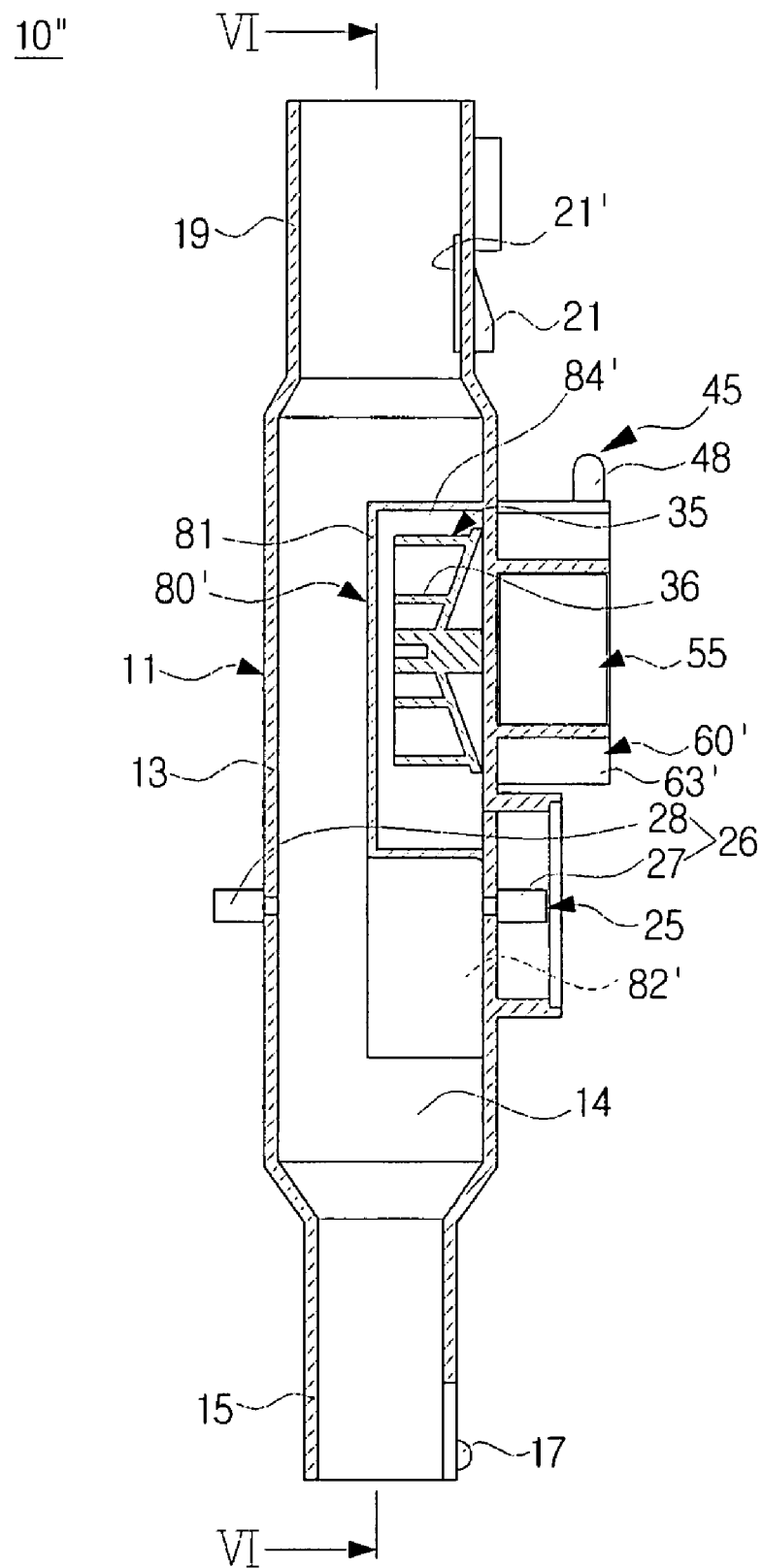
FIG. 5 is a cross-sectional view exemplifying a dust sensing unit for use in a vacuum cleaner according to a third exemplary embodiment of the present disclosure from which a cover is omitted.
Figure 6:
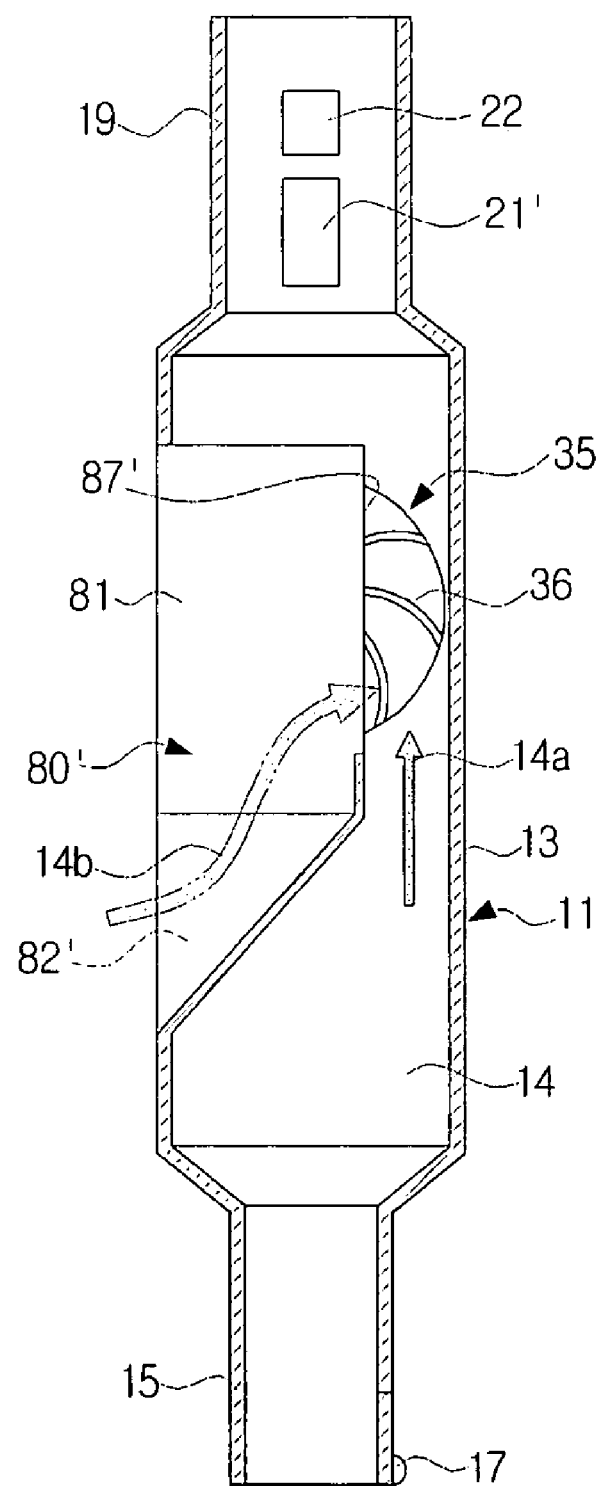
FIG. 6 is a cross-sectional view taken along line VI-VI of FIG. 5.

FIGS. 5 and 6 exemplify a dust sensing unit 10" for use in a vacuum cleaner according to a third exemplary embodiment of the present disclosure.

The dust sensing unit 10" of the third exemplary embodiment has constructions similar to those of the dust sensing unit 10 of the first exemplary embodiment explained with reference to FIG. 1 except that it further includes a subsidiary rotation driving-passage part 80' disposed in the air flowing passage 14 of the rectangular parallelepiped tube 13 of the body 11. Accordingly, a detailed description on the constructions of the dust sensing unit 10" except the subsidiary rotation driving-passage part 80' will be omitted.

Like the subsidiary rotation driving-passage part 80 of the dust sensing unit 10' of the second exemplary embodiment illustrated in FIG. 4, the subsidiary rotation driving-passage part 80', which directly draws in an external air from the outside by the suction force of the suction motor and thus rotates the impeller 36 along with the air in the air flowing passage 14 drawn in through the suction nozzle 110, functions to lessen the contamination of the impeller 36 due to the dust or dirt included in the drawn-in air, as well as to promote the rotation of the impeller 36. However, the subsidiary rotation driving-passage part 80 of the dust sensing unit 10' of the second exemplary embodiment is formed to the rotating part-mounting part 61 of the generator bracket 60 disposed on the outside of the one surface of the rectangular parallelepiped tube 13, whereas the subsidiary rotation driving-passage part 80' is made up of a flowing passage guide 81 disposed in the air flowing passage 14 of the rectangular parallelepiped tube 13.

As illustrated in FIG. 6, the flowing passage guide 81 is formed in the form of a duct disposed in the air flowing passage 14 to divide the air flowing passage 14 into an inner air passage 14a and an external air passage 14b, and includes an inlet 82', an impeller-mounting space 84', and an outlet 87'. The inlet 82', which directly draws in the external air from the outside by the suction force of the suction motor, is formed in a lower part of the flowing passage guide 81. At this time, as illustrated in FIG. 3, if the muffler part 31 is included in the dust sensing unit 10", the inlet 82' is formed, so that it is hermetically extended to the outside through the cover 18 from the lower part of the flowing passage guide 81 so as not to draw in the air in the dust sensing unit 10". The impeller-mounting space 84' is a space through which the external air drawn in through the inlet 82' moves to rotate the impeller 36, and the impeller 36 is rotatably disposed in the impeller-mounting space 84'. A rotating axis of the impeller 36 is connected to an axis of the electric generator 55, which is mounted in a generator bracket 60' disposed on an outer side of the rectangular parallelepiped tube 13 of the body 11. That is, the generator bracket 60' does not have a separate rotating part-mounting part like as in the generator bracket 60 of the dust sensing units 10 and 10' of FIGS. 1 and 4, and the impeller 36 of the rotating part 35 is disposed in the air flowing passage 14 through the flowing passage guide 81. The outlet 87' at which the external air passing through the impeller-mounting space 84' joins the air of the air flowing passage 14 is formed in a size that allows a portion of the impeller 36 to project into the air flowing passage 14.

An operation of the dust sensing unit 10" for use in the vacuum cleaner constructed as described above is the same as that of the dust sensing unit 10 of the first exemplary embodiment explained with reference to FIG. 1 except that the external air is additionally drawn in through the flowing passage guide 81 of the subsidiary rotation driving-passage part 80' to rotate the impeller 36, so that it assists the electric generator 55 to generate the electric power. Accordingly, a detailed description on the operation of the dust sensing unit 10" will be omitted.

Figure 7:
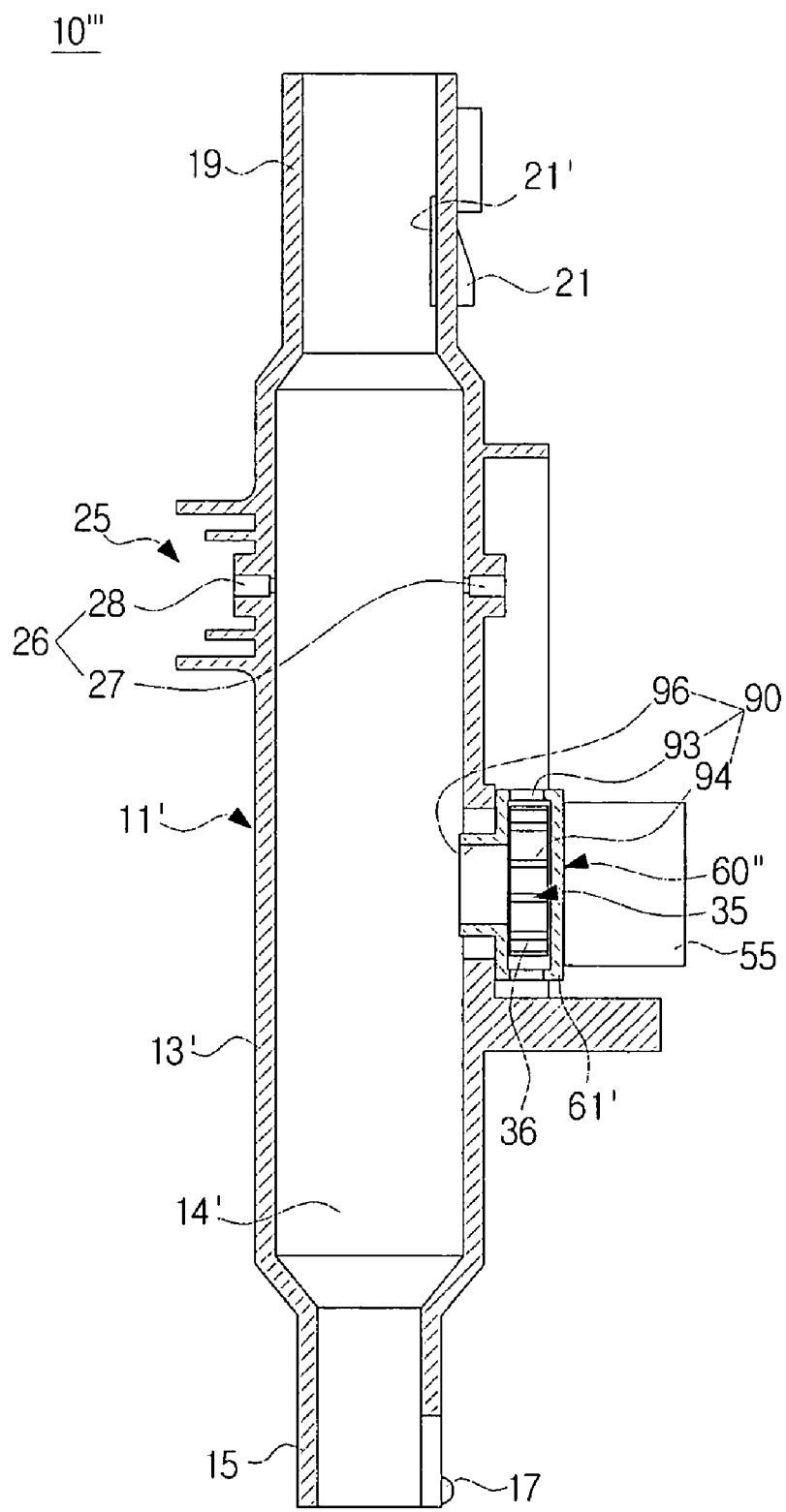
FIG. 7 is a cross-sectional view exemplifying a dust sensing unit for use in a vacuum cleaner according to a fourth exemplary embodiment of the present disclosure from which a cover is omitted.

FIG. 7 exemplifies a dust sensing unit 10''' for use in a vacuum cleaner according to a fourth exemplary embodiment of the present disclosure.

The dust sensing unit 10''' of the fourth exemplary embodiment has constructions similar to those of the dust sensing unit 10 of the first exemplary embodiment explained with reference to FIG. 1 except that it has a separate rotation driving-passage part 90 separated from a cylindrical tube 13' of a body 11' on an outer side of the cylindrical tube 13'. Accordingly, a detailed description on the constructions of the dust sensing unit 10''' except the rotation driving-passage part 90 will be omitted.

Like the subsidiary rotation driving-passage parts 80 and 80' of the dust sensing units 10' and 10'' of the second and the third exemplary embodiments illustrated in FIGS. 4 and 5, the rotation driving-passage part 90 is configured, so that it directly draws in an external air from the outside by the suction force of the suction motor, but rotates the impeller 36 only by the external air. That is, the rotation driving-passage part 90 is formed in a rotating part-mounting part 61' of a generator bracket 60'' separately formed from the cylindrical tube 13' of the body 11', so that a portion of the impeller 36 is not projected into an air flowing passage 14.

The rotation driving-passage part 90 is made up of a plurality of suction openings 93 formed in a spaces-apart relation from one another in an outer circumferential surface of the impeller-mounting part 61' to drawn in the external air, an impeller-mounting space 94 in which the impeller 36 is disposed and which is in the impeller-mounting part 61', and a discharging tube part 96 formed in a direction perpendicular to an air-flowing direction of the air flowing passage 14' of the cylindrical tube 13' in a side surface of the impeller-mounting part 61' to communicate with the air flowing passage 14' of the cylindrical tube 13'. At this time, the impeller 36 and the electric generator 55 are mounted in and on the impeller-mounting part 61' of the generator bracket 60'', so that axes thereof are perpendicularly arranged to the air-flowing direction of the air flowing passage 14' of the cylindrical tube 13'. In addition, as illustrated in FIG. 3, if the muffler part 31 is included in the dust sensing unit 10''', preferably, but not necessarily, the part mounting area in which the detecting sensor 25, the lamp part 45, the rotating part 35, and the electric generator 55 are disposed is isolated from the part non-mounting area by a partition (not illustrated), so that the air in the dust sensing unit 10''' is not drawn in through the suction openings 93. In this case, alternatively, the part mounting area and the part non-mounting area can be closed up by separate covers (not illustrated) instead of the single cover 18.

An operation of the dust sensing unit 10''' for use in the vacuum cleaner constructed as described above is the same as that of the dust sensing units 10, 10' and 10'' explained with reference to FIGS. 1, 4 and 5 except that the impeller 36 of the rotating part 35 is rotated by the external air drawn in through the rotation driving-passage part 90 to drive the electric generator 55 and thus to allow the electric generator 55 to generate the electric power. Accordingly, a detailed description on the operation of the dust sensing unit 10''' will be omitted.

Figure 8:
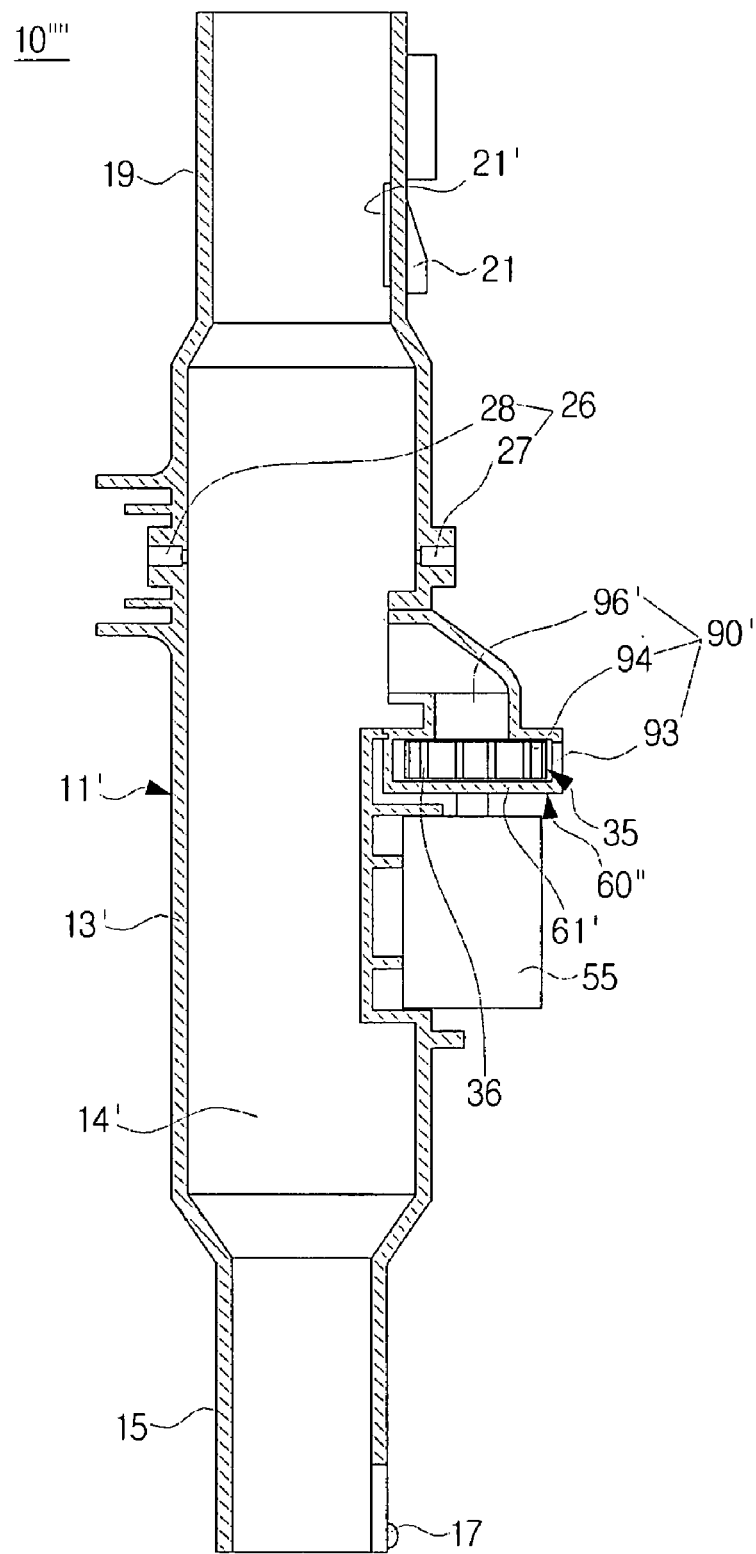
FIG. 8 is a cross-sectional view exemplifying a dust sensing unit for use in a vacuum cleaner according to a fifth exemplary embodiment of the present disclosure from which a cover is omitted.

FIG. 8 exemplifies a dust sensing unit 10'''' for use in a vacuum cleaner according to a fifth exemplary embodiment of the present disclosure.

Constructions and operation of the dust sensing unit 10'''' of the fifth exemplary embodiment are almost the same as those of the dust sensing unit 10''' of the fourth exemplary embodiment explained with reference to FIG. 7 except that an impeller 36 and an electric generator 55 is disposed to have axes parallel to the air flowing direction of the air flowing passage 14', respectively, and thus a discharging tube part 96' of a rotation driving-passage part 90 is formed of a reverse L-lettered shape. Accordingly, a detailed description on the constructions and the operation of the dust sensing unit 10'''' will be omitted.

Figure 9:
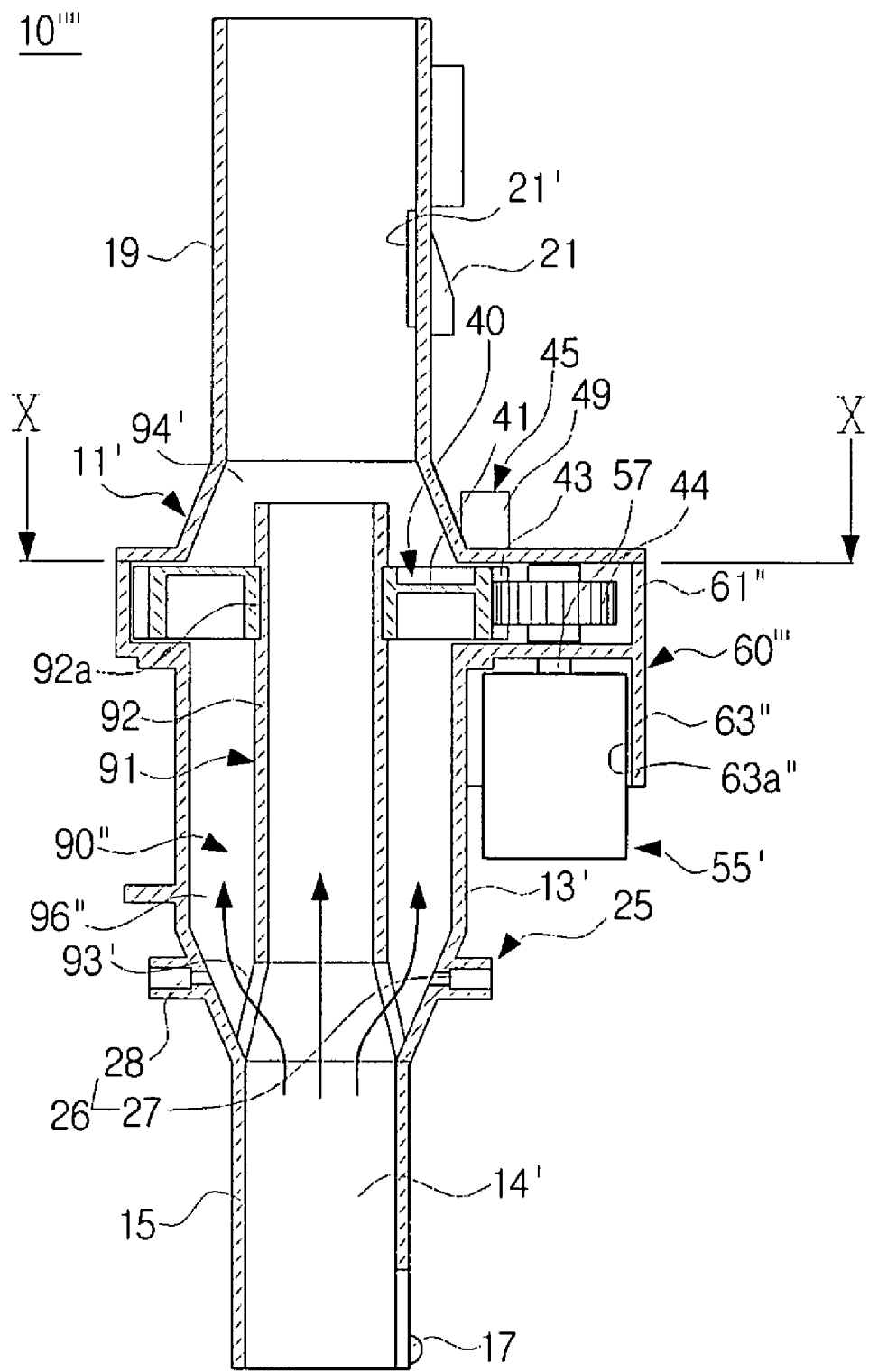
FIG. 9 is a cross-sectional view exemplifying a dust sensing unit for use in a vacuum cleaner according to a sixth exemplary embodiment of the present disclosure from which a cover is omitted.

FIG. 9 exemplifies a dust sensing unit 10''''' for use in a vacuum cleaner according to a sixth exemplary embodiment of the present disclosure.

The dust sensing unit 10''''' of the sixth exemplary embodiment has constructions similar to those of the dust sensing unit 10 of the first exemplary embodiment explained with reference to FIG. 1 except that it has a rotation driving-passage part 90'' separated from the air flowing passage 14' in the air flowing passage 14' of the cylindrical tube 13' of the body 11' and a fan 41 of the rotating part 40 is disposed to the rotation driving-passage part 90''. Accordingly, a detailed description on the constructions of the dust sensing unit 10''''' except the rotation driving-passage part 90'' and the rotating part 40 will be omitted.

The rotation driving-passage part 90'', which diverges a portion of the air moving through the air flowing passage 14' therefrom and then guides the portion of the air to drive the fan 41 of the rotating part 40, is made up of a flowing passage guide 91 formed in the cylindrical tube 13' of the body 11'. The flowing passage guide 91 includes a hollow cylindrical element 92, a suction opening 93' and a discharging opening 94'. The hollow cylindrical element 92 is coaxially disposed with the cylindrical tube 13' in the air flowing passage 14' of the cylindrical tube 13' to form a predetermined annular space 96'' between the hollow cylindrical element 92 and the cylindrical tube 13'. At this time, to form the annular space 96'', preferably, but not necessarily, the cylindrical tube 13' at the middle thereof in which the hollow cylindrical element 92 is coaxially disposed therewith is configured to have a diameter very larger than that of the hollow cylindrical element 92, and at both sides thereof in which the hollow cylindrical element 92 is not coaxially disposed therewith is configured to have a diameter a little larger than that of the hollow cylindrical element 92. With this configuration of the cylindrical tube 13', a portion of air flowed into the air flowing passage 14' can be easily moved into the annular space 96'', and at the same time, dust or dirt included in the air is restrained from flowing into the annular space 96'' as maximum as possible. The suction opening 93' is formed to an upstream side of the hollow cylindrical element 92 connected with the cylindrical tube 13', so that it introduces the portion of the air flowed into the cylindrical tube 13' into the annular space 96''. The discharging opening 94' is formed to a downstream side of the hollow cylindrical element 92 connected with the cylindrical tube 13', so that it allows the air passing through the annular space 96'' to join the air of the air flowing passage 14' again. Preferably, but not necessarily, the suction opening 93' and the discharging opening 94' are formed in the form of a plurality of holes, respectively.

Figure 10:
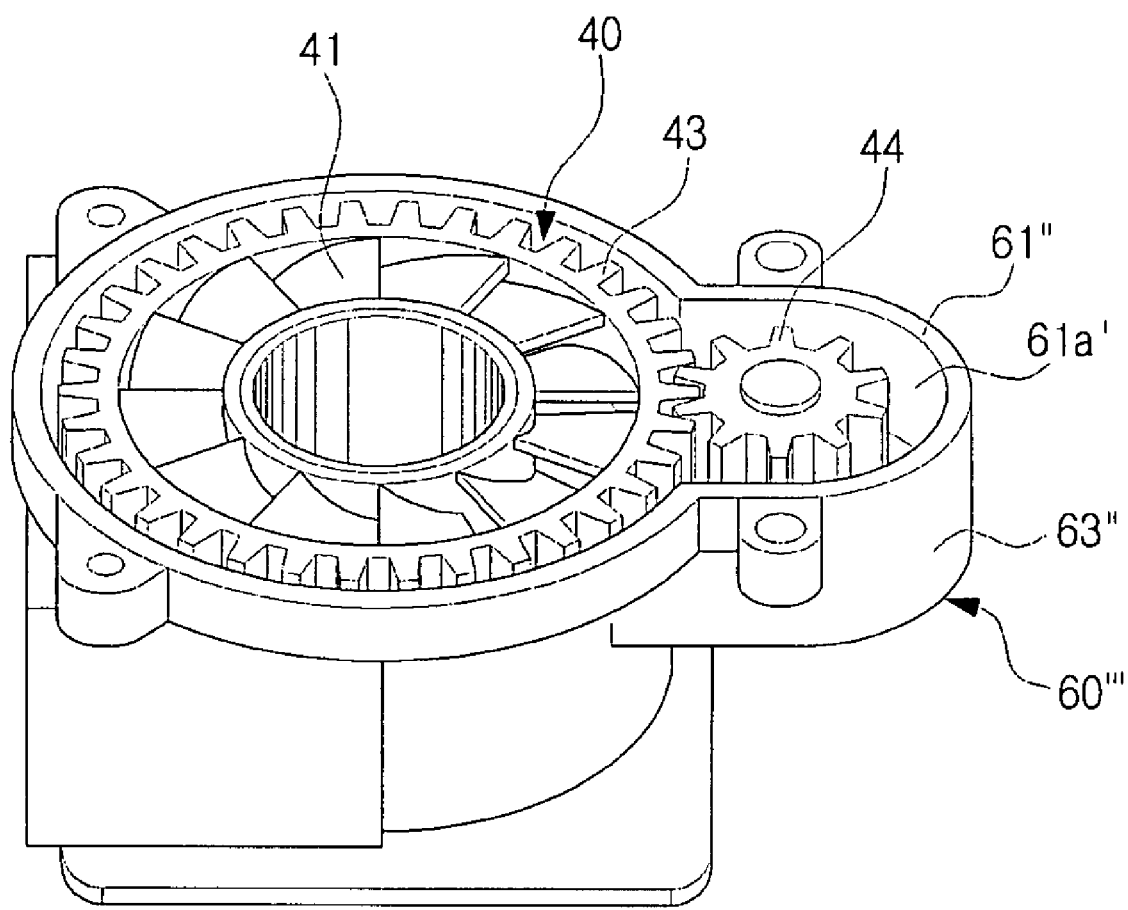
FIG. 10 is a partial perspective view taken along line X-X of FIG. 9.

The rotating part 40 is formed of a fan 41. The fan 41 is disposed around the hollow cylindrical element 92 to cross the annular space 96'' and thus is rotated by the air passing through the annular space 96''. As illustrated in FIG. 10, on an outer circumferential surface of the fan 41 is formed a driving gear 43. The fan 41 at an inner circumferential surface thereof is rotatably supported in a supporting groove 92a (see FIG. 9) of the hollow cylindrical element 92. The driving gear 43 on the outer circumferential surface of the fan 41 is rotatably supported in an upper supporting space 61a' of a rotating part-mounting part 61" of a generator bracket 60'". An electric generator 55 is disposed parallel to a longitudinal axis of the cylindrical tube 13' in a lower supporting space 63a" of a generator-mounting part 63" of a generator bracket 60'". The electric generator 55 has a driven gear 44 connected to an axis 57 thereof. The driven gear 44 is disposed in the upper supporting space 61a' of the rotating part-mounting part 61", so that it is engaged with the driving gear 43 formed on the outer circumferential surface of the fan 41.

Accordingly, when the fan 41 is rotated by the air moving through annular space 96" of the rotation driving-passage part 90", the driven gear 44 engaged with the driving gear 43 of the fan 41 is also rotated, and thus the axis 57 of the electric generator 55 connected with the driven gear 44 is rotated to allow the electric generator 55 to generate an electric power.

An operation of the dust sensing unit 10"'" for use in the vacuum cleaner constructed as described above is the same as that of the dust sensing unit 10 explained with reference to FIG. 1 except that the portion of the drawn-in air diverges from the air flowing passage 14' by means of the flowing passage guide 91 of the rotation driving-passage part 90" and then rotates the fan 41 of the rotating part 40 to drive the electric generator 55. Accordingly, a detailed description on the operation of the dust sensing unit 10"'" will be omitted.

As apparent from the foregoing description, according to the exemplary embodiments of the present disclosure, the dust sensing unit for use in the vacuum cleaner can automatically detect whether there is dust or dirt on a surface to be cleaned and inform the user of the detected result without using the external battery in cleaning. Accordingly, the dust sensing unit according to the exemplary embodiments of the present disclosure is advantageous in that there is no need for exchanging the batteries, thereby allowing the dust sensing unit to easily maintain and repair, as compare with the conventional dust sensing apparatus.

Further, according to the exemplary embodiments of the present disclosure, the dust sensing unit for use in the vacuum cleaner is configured to be replaced as a single part in failure, and at the same time, to be modularized, thereby reducing the maintenance cost.

Also, according to the exemplary embodiments of the present disclosure, the dust sensing unit for use in the vacuum cleaner has the rotating part disposed, so that it is isolated from the dust or dirt of the air flowing passage as maximum as possible, thereby preventing the failure of the rotating part and the failure of the electric generator according thereto and improving the lifespan of the rotating part and the electric generator.

Although representative embodiments of the present disclosure have been shown and described in order to exemplify the principle of the present disclosure, the present disclosure is not limited to the specific exemplary embodiments. It will be understood that various modifications and changes can be made by one skilled in the art without departing from the spirit and scope of the disclosure as defined by the appended claims. Therefore, it shall be considered that such modifications, changes and equivalents thereof are all included within the scope of the present disclosure.

What is claimed is:

1. A dust sensing unit for use in a vacuum cleaner, comprising:
    a body having an air flowing passage therein to move air laden with dust or dirt drawn in through a suction nozzle;
    a detecting sensor disposed on the air flowing passage of the body to detect whether the dust or dirt passes through the air flowing passage;
    a lamp part to operate according to a signal outputted from the detecting sensor;
    a rotating part disposed in the body and being configured to rotate by air drawn in through a suction nozzle and through the air flowing passage; and
    an electric generator rotated by the rotating part to generate an electric power, wherein the body is disposed between the suction nozzle and a cleaner body, and the electric generator supplies the electric power to at least one of the detecting sensor and the lamp part, wherein the rotating part is disposed, so that a portion of the rotating part is disposed to project into the air flowing passage.

2. The dust sensing unit of claim 1, wherein the body is detachably disposed in a location selected from the group consisting of between the suction nozzle and an extended tube, between the extended tube and an operating handle, and between a suction hose and the cleaner body.

3. The dust sensing unit of claim 1, wherein the body is integrally formed with a portion selected from the group consisting of the suction nozzle, an extended tube, an operating handle, and a suction hose.

4. The dust sensing unit of claim 1, wherein the detecting sensor comprises an optical sensor having a light-emitting part and a light-receiving part.

5. The dust sensing unit of claim 1, wherein the lamp part comprises:
    a first lamp to operate according to a first signal generated when the detecting sensor detects the dust or dirt; and
    a second lamp to operate according to a second signal generated when the detecting sensor does not detect the dust or dirt.

6. The dust sensing unit of claim 1, wherein the rotating part comprises an impeller having a rotating axis disposed parallel to or perpendicular to a longitudinal axis of the air flowing passage.

7. The dust sensing unit of claim 1, further comprising a muffler part to reduce noises generating in rotating of the rotating part.

8. A dust sensing unit for use in a vacuum cleaner, comprising:
    a body having an air flowing passage therein to move air laden with dust or dirt drawn in through a suction nozzle;
    a detecting sensor disposed on the air flowing passage of the body to detect whether the dust or dirt passes through the air flowing passage;
    a lamp part to operate according to a signal outputted from the detecting sensor;
    a rotating part disposed in the body so that a portion of the part projects into the air flowing passage and being configured to rotate by air drawn in through a suction nozzle and flowing through the air flowing passage;
    an electric generator rotated by the rotating part to generate an electric power, wherein the body is disposed between the suction nozzle and a cleaner body, and the electric generator supplies the electric power to at least one of the detecting sensor and the lamp part; and
    a muffler part to reduce noises generating in rotating of the rotating part, wherein the muffler part comprises:
    a plurality of resonating holes formed in the body; and
    a noise-absorbing member filled in a space between a cover and the body.

9. A dust sensing unit for use in a vacuum cleaner, comprising:
    a body having an air flowing passage therein to move air laden with dust or dirt drawn in through a suction nozzle;

a detecting sensor disposed on the air flowing passage to detect whether the dust or dirt passes through the air flowing passage;

a lamp part to operate according to a signal outputted from the detecting sensor;

a rotating part disposed in the body so that a portion of the part projects into the air flowing passage and being configured to rotate by air drawn in through a suction nozzle and flowing through the air flowing passage;

an electric generator rotated by the rotating part to generate an electric power, wherein the electric generator supplies the electric power to at least one of the detecting sensor and the lamp part; and a subsidiary rotation driving-passage part to draw in an external air from the outside by a suction force of the vacuum cleaner and thus to allow the external air to rotate the rotating part along with the air drawn in through the suction nozzle.

10. The dust sensing unit of claim 9, wherein the subsidiary rotation driving-passage part is formed to a rotating part-mounting part disposed on an outside of the body to mount the rotating part therein, and comprises an inlet to drawn in the external air, a rotating part-mounting space in which the rotating part is disposed and through which the external air moves, and an outlet in which a portion of the rotating part is disposed to project into the air flowing passage and at which the external air joins the air of the air flowing passage.

11. The dust sensing unit of claim 9, wherein the subsidiary rotation driving-passage part comprises a flowing passage guide formed in the body to install the rotating part therein, and the flowing passage guide comprises an inlet to draw in the external air, a rotating part-mounting space in which the rotating part is disposed and in which the external air moves through the rotating part, and an outlet in which a portion of the rotating part is disposed to project into the air flowing passage and at which the external air joins the air of the air flowing passage.

12. A dust sensing unit for use in a vacuum cleaner, comprising:

a body having an air flowing passage therein to move air laden with dust or dirt drawn in through a suction nozzle;

a detecting sensor disposed on the air flowing passage of the body to detect whether the dust or dirt passes through the air flowing passage;

a lamp part to operate according to a signal outputted from the detecting sensor;

a rotating part disposed in the body so that a portion of the part projects into the air flowing passage and being configured to rotate by air drawn in through a suction nozzle and flowing through the air flowing passage;

an electric generator rotated by the rotating part to generate an electric power, wherein the body is disposed between the suction nozzle and a cleaner body, and the electric generator supplies the electric power to at least one of the detecting sensor and the lamp part; and a rotation driving-passage part to drawn in an external air from the outside by means of a suction force of the vacuum cleaner thus to rotate the rotating part only by the external air, wherein the rotation driving-passage part is formed to a rotating part-mounting part disposed on an outside of the body to mount the rotating part therein, and comprises a plurality of suction openings formed in an outer circumferential surface of the rotating part-mounting part to drawn in the external air, a rotating part-mounting space in which the rotating part is disposed and in which the external air moves through the rotating part, and a discharging tube part formed to a surface of the rotating part-mounting part to communicate with the air flowing passage.

13. A dust sensing unit for use in a vacuum cleaner, comprising:

a body having an air flowing passage therein to move air laden with dust or dirt drawn in through a suction nozzle;

a detecting sensor disposed on the air flowing passage of the body to detect whether the dust or dirt passes through the air flowing passage;

a lamp part to operate according to a signal outputted from the detecting sensor;

a rotating part disposed in the body so that a portion of the part projects into the air flowing passage and being configured to rotate by air drawn in through a suction nozzle and flowing through the air flowing passage;

an electric generator rotated by the rotating part to generate an electric power, wherein the body is disposed between the suction nozzle and a cleaner body, and the electric generator supplies the electric power to at least one of the detecting sensor and the lamp part; and a rotation driving-passage part to diverge a portion of the air moving through the air flowing passage therefrom and then to guide the portion of the air to drive the rotating part.

14. The dust sensing unit of claim 13, wherein the rotation driving-passage part comprises a flowing passage guide formed in the body to install the rotating part therein, and the flowing passage guide comprises a hollow cylindrical element coaxially disposed with the body in the air flowing passage to form a predetermined annular space between the hollow cylindrical element and the body, a suction opening formed to an upstream side of the hollow cylindrical element connected with the body, to introduce the portion of the air moving through the air flowing passage into the annular space, and a discharging opening formed to a downstream side of the hollow cylindrical element connected with the body, to allow the portion of the air passing through the annular space to join the air of the air flowing passage again.

15. The dust sensing unit of claim 14, wherein the rotating part comprises a fan rotatably disposed around the hollow cylindrical element to cross the annular space and thus to be rotated by the air passing through the annular space, and the electric generator comprises a driven gear formed to engage with a driving gear formed on an outer circumferential surface of the fan.

* * * * *